April 9, 1946. N. STRAUSSLER 2,398,057
PROPULSION DEVICE FOR AMPHIBIOUS VEHICLES
Filed May 19, 1943 3 Sheets-Sheet 2
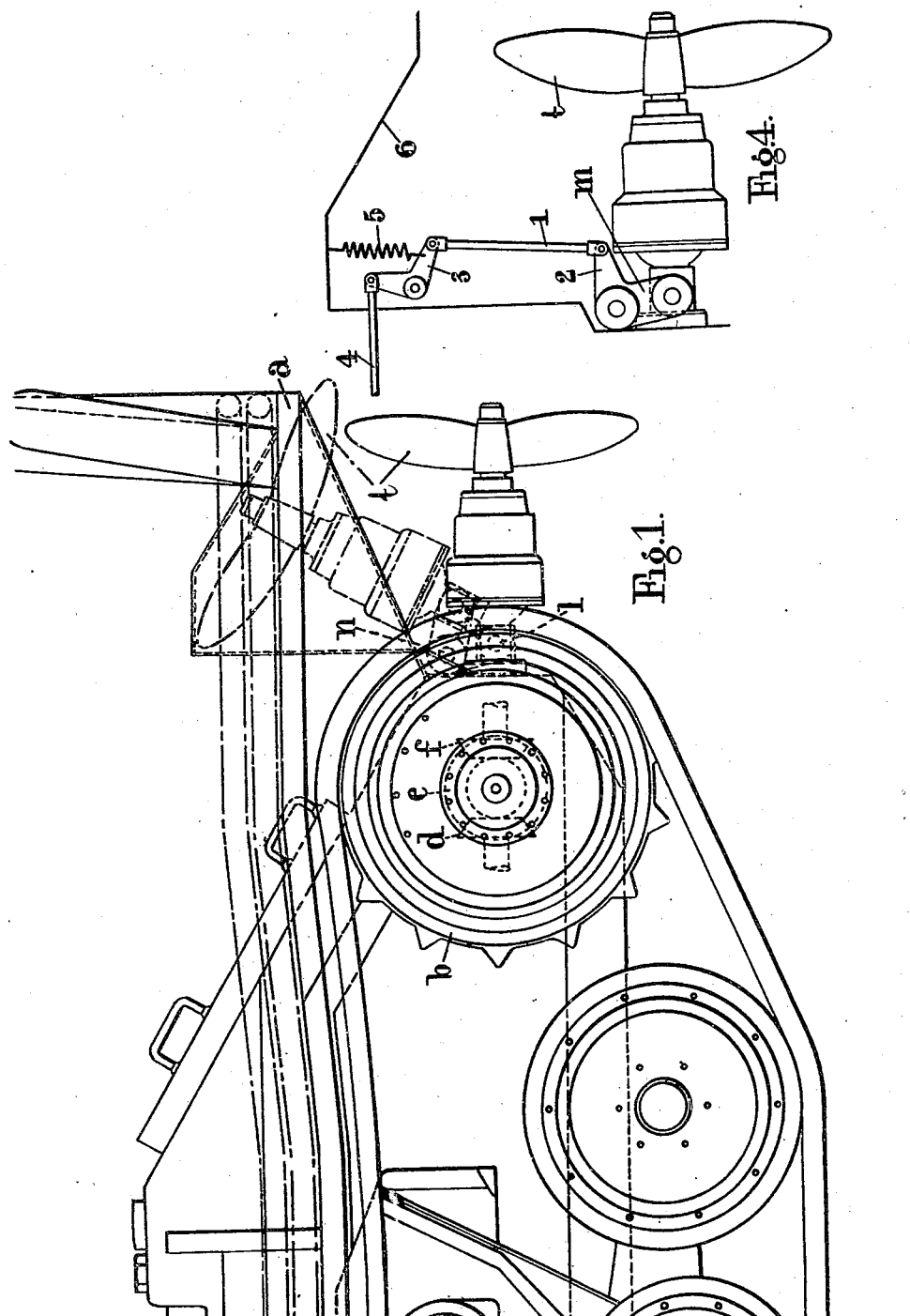
Inventor
N. Straussler
By Hascock Downing & Seeble Attys

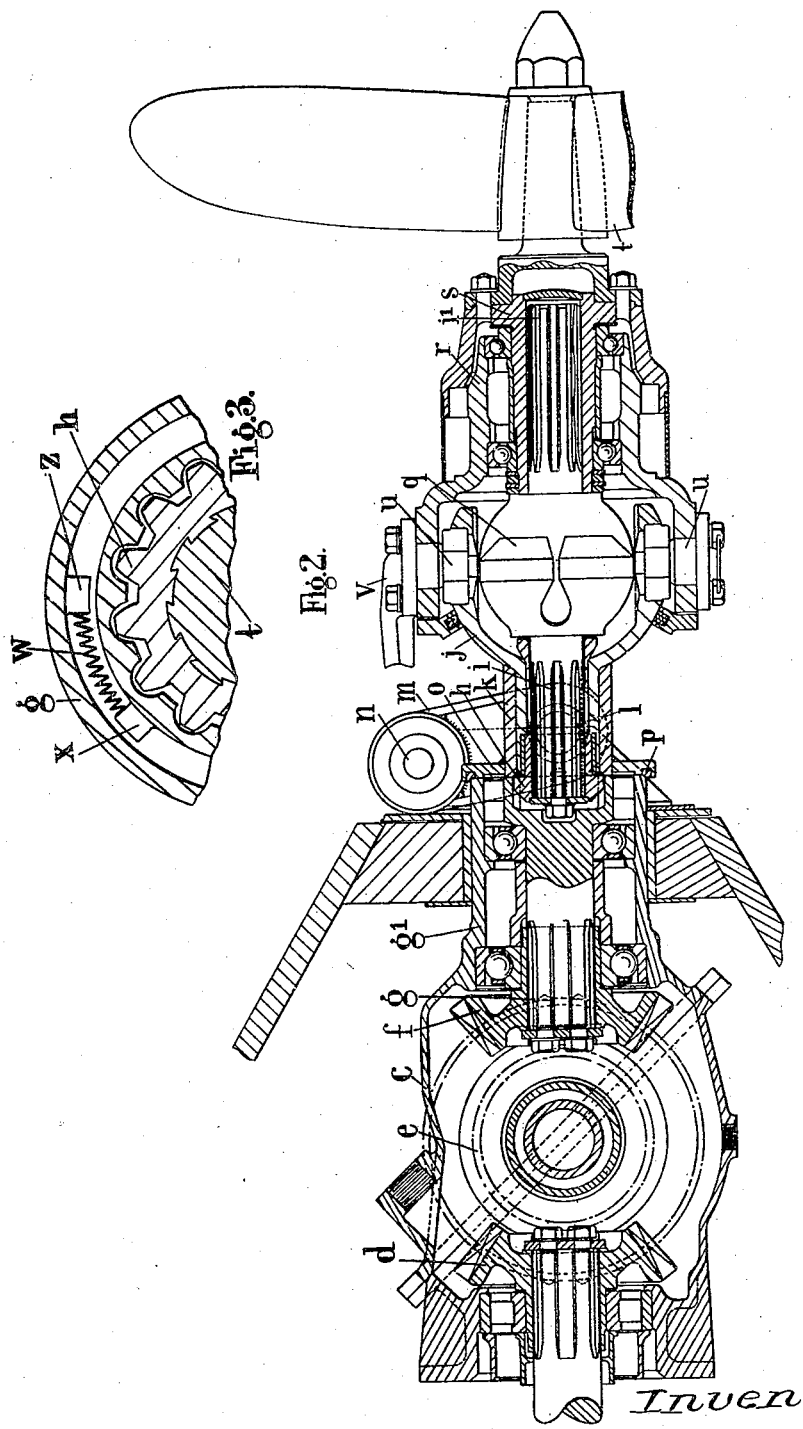

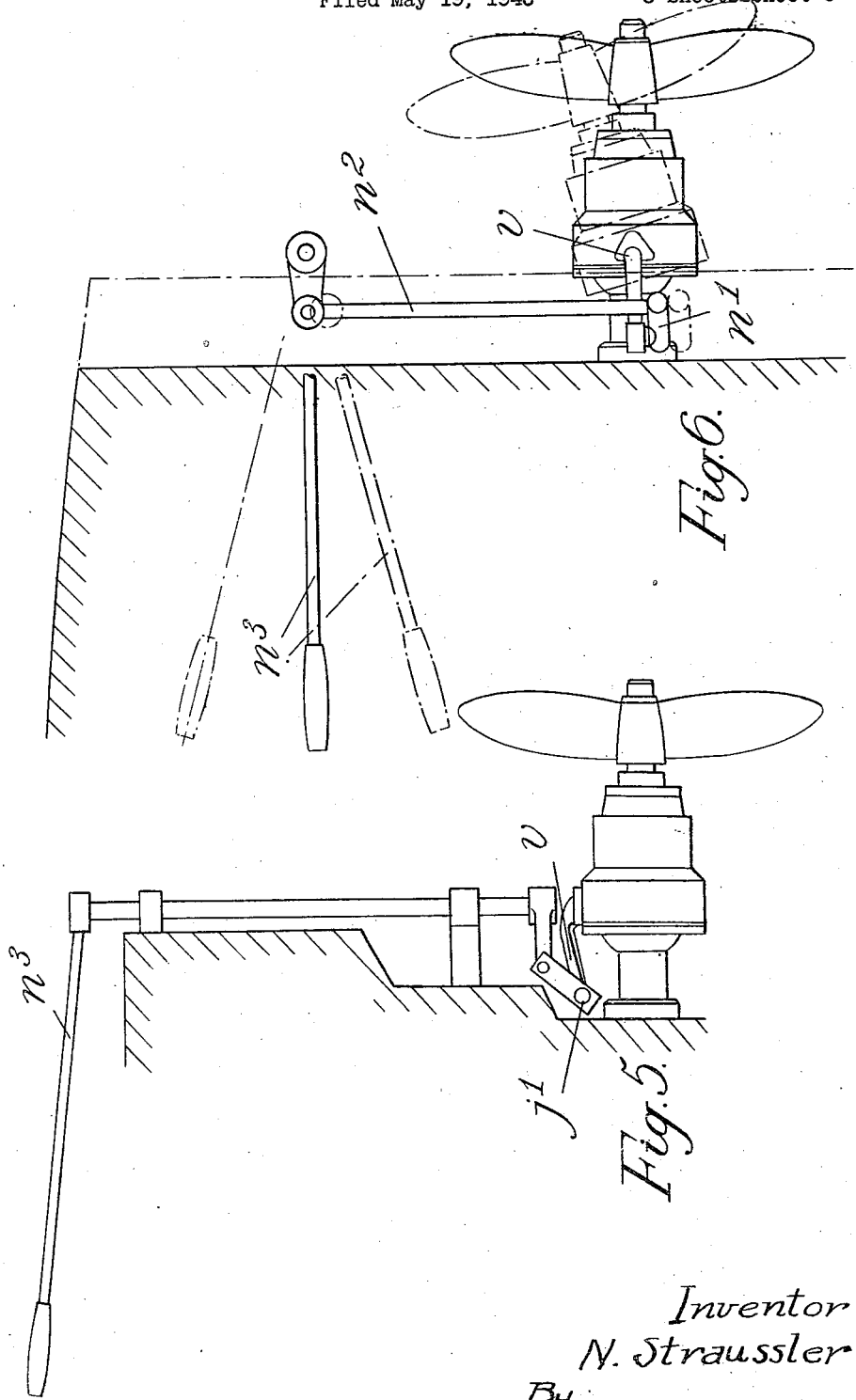

Patented Apr. 9, 1946

2,398,057

UNITED STATES PATENT OFFICE 2,398,057

PROPULSION DEVICE FOR AMPHIBIOUS VEHICLES

Nicholas Straussler, London, England

Application May 19, 1943, Serial No. 487,622
In Great Britain March 10, 1942

2 Claims. (Cl. 115—1)

This invention relates to the propulsion of amphibious motor driven vehicles when afloat.

The invention is particularly applicable to the propulsion of amphibious motor driven tanks as described in my specification No. 434,604 of 1942, now Patent No. 2,390,747, dated December 11, 1945, but is not confined thereto.

The primary object of the invention is to provide propulsion means for such vehicles, having provision whereby the direction of thrust can be changed to steer the vehicle.

A further object of the invention is to provide for readily moving the propulsion means to a position so that it will be disconnected from the drive and be well clear of the ground and obstructions thereon during travel of the vehicle on land.

The invention consists in means for propulsion, when afloat, of an amphibious motor driven vehicle comprising a rotatably mounted propeller carried by a support adapted to be adjusted about a vertical or substantially vertical axis for steering the vehicle.

The support may be pivoted for such adjustment on an auxiliary support which is mounted for movement about a horizontal or substantially horizontal axis so that the propulsion means can be swung upwardly and supported well clear of the ground level during use of the vehicle on land.

Referring now to the accompanying drawings which illustrate the invention as applied to an amphibious tank, Figure 1 is a side elevation of the rear portion of the vehicle, Figure 2 is a sectional elevation on an enlarged scale, Figure 3 is a detail view of a modified form of clutch for driving the propulsion means from the vehicle motor, and Figure 4 is a side elevation of manually operable lifting and lowering means.

Figs. 5 and 6 are side and plan views, respectively, of an arrangement for imparting steering movement of the propeller.

In carrying out the invention according to one mode, $a$ is the body of the vehicle and $b$ the driving sprocket of one of the endless tracks. The rear axle gear casing is shown at $c$ the axle being driven from the motor by a bevel pinion $d$ meshing with a bevel wheel $e$ fixed to the axle.

For the purpose of propelling the vehicle when afloat an additional bevel pinion $f$ is provided which also meshes with the bevel wheel $e$ and is splined or otherwise fixed for rotation to the forward end of a shaft $g$ mounted for rotation in bearings in a tubular projection $g^1$ from the rear section of the gear casing $c$. The rear end of the shaft $g$ constitutes the female element of a dog coupling $h$ the male element of which has splined connection with the inner end of a propeller shaft $i$ which is mounted for rotation in the forward section of a casing $j$ hereinafter more fully described. The forward section of the casing $j$ has welded on its exterior a tubular member $k$ carrying a pair of laterally projecting support pins $l$ serving for suspension of the propeller shaft and its appurtenant parts, by means of a pair of links $m$ fixed at their lower ends on the support pins $l$ and pivoted at their upper ends on pivot pins or trunnions $n$ fixed to the back of the vehicle. The forward end of the tubular member $k$ has welded thereto an annular plate $o$ having an inset annular sealing ring $p$ which when the parts are in the positions shown in full lines in the figures engages the rear edge of the tubular projection $g^1$. Thus the latter and the ring plate $o$ serve as abutments which limit downward swinging of the parts about the trunnions $n$.

The propeller shaft comprises forward and rear sections $ii^1$ connected by a universal shaft coupling $q$ preferably of the constant angular velocity type, and the rear section $i^1$ extends into a horizontal tubular projection $r$ from the rear section of the casing $j$. The rear section $i^1$ is splined to a sleeve $s$ which is mounted for rotation in a bushing or bearings secured within the tubular projection $r$. The outer end of the sleeve $s$ has secured thereto the propeller $t$ and any suitable means may be provided to prevent ingress of water into the casing $j$.

The rear section of the casing $j$ carries at its forward end, and fixed thereto, a pair of trunnions $u$ having their axes vertical or substantially in alignment. The trunnions $u$ are rotatably mounted in bearings in the forward section of the casing $j$ and thus the rear section thereof together with the rear section $i^1$ of the propeller shaft and the propeller can be turned about a vertical axis for steering the vehicle, the universal coupling $q$ permitting such movement without interfering with the drive, it being understood that the axis of turning movement extends through the centre of the universal coupling.

Turning of these parts for steering the vehicle when afloat may be effected by any suitable means such as shown in Figs. 5 and 6. For example a forwardly extending arm $v$ is fixed to the rear section of the casing $j$, the forward end of the arm being connected by a universal joint $j^1$, having its center co-inciding with the axis of the trunnions $n$, to a link $n^1$ the other end of which is connected by a universal joint to a link $n^2$ having its other end connected by a universal joint to a tiller lever $n^3$ intermediate the ends thereof, the tiller lever being pivoted at its rear end for movement about a vertical axis and having its forward end extending into the vehicle for manual manipulation.

Suitable shock absorber means may be incorporated in the drive so as to permit engagement of the members of the dog coupling without shock and injury. Figure 3 shows a suitable shock absorbing means in which the female member of the dog clutch is mounted for limited rotation against the action of springs $w$ relatively to, and within a recess in the end of the shaft $g$. Each spring has one end engaging an abutment $x$ on the female member and a projection $z$ on the shaft $g$.

Lifting and lowering of the propeller shaft, propeller and their appurtenant parts to the position shown in dotted lines in Figure 1, may be effected by any suitable lever and link mechanism operable manually or by hydraulic, electrical, or other power means from the interior of the vehicle, means being provided for holding the mechanism in elevated and depressed positions.

In the case of manual operation, means may be provided to reduce the amount of effort required to elevate the mechanism. This may take the form of a simple tension spring or springs as shown in Figure 4 connected to the movable part of the mechanism and vehicle.

Referring particularly to Figure 4, the mechanism consists of a link 1 connected at one end to a projection 2 on one of the links $m$ and at its other end to one arm 3 of a bell crank lever the other arm of which is connected to an operating member 4. A tension spring 5 is connected at one end to the arm 3 and at the other end to the housing 6.

I claim:

1. In an amphibious motor driven vehicle, a vehicle body, a driving clutch member mounted in said body, a propeller shaft, a propeller carried by said shaft, a casing rotatably receiving said shaft, a driven clutch member carried by said shaft, and means mounting said casing to swing about a horizontal axis on said body whereby the driven clutch member may be swung into engagement with the driving clutch member with the propeller occupying an operative position and out of engagement with the driving clutch member with the propeller assuming an elevated inoperative position.

2. An amphibious vehicle as claimed in claim 1 wherein said propeller shaft is composed of two sections coupled by a universal joint, the casing including front and rear sections, the front casing section being connected with the mounting means and the rear section being movable about a vertical axis passing through said universal joint.

NICHOLAS STRAUSSLER.